(12) United States Patent
Bhatia et al.

(10) Patent No.: US 10,146,875 B2
(45) Date of Patent: Dec. 4, 2018

(54) INFORMATION PROPAGATION VIA WEIGHTED SEMANTIC AND SOCIAL GRAPHS

(71) Applicant: International Business Machines Corporation, Armonk, NY (US)

(72) Inventors: Nimesh Bhatia, San Jose, CA (US); Seyyed Vahid Hashemian, San Mateo, CA (US); Cindy H. Lu, San Jose, CA (US); Thai Q. Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 14/576,353

(22) Filed: Dec. 19, 2014

(65) Prior Publication Data

US 2016/0179965 A1 Jun. 23, 2016

(51) Int. Cl.
  *G06F 17/30* (2006.01)
(52) U.S. Cl.
  CPC ............... *G06F 17/30867* (2013.01)
(58) Field of Classification Search
  CPC combination set(s) only.
  See application file for complete search history.

(56) References Cited

U.S. PATENT DOCUMENTS

| | | | |
|---|---|---|---|
| 7,849,201 B1 * | 12/2010 | Subbarao ................ | G06F 15/16 370/229 |
| 7,865,592 B2 | 1/2011 | Chakra et al. | |
| 8,332,345 B1 | 12/2012 | Murphy et al. | |
| 8,473,437 B2 | 6/2013 | Zaman et al. | |
| 8,600,812 B2 | 12/2013 | Zhang et al. | |
| 8,612,293 B2 | 12/2013 | Benyamin et al. | |
| 9,824,145 B1 * | 11/2017 | Rohrweck ......... | G06F 17/30861 |
| 2007/0033531 A1 | 2/2007 | Marsh | |
| 2007/0050343 A1 * | 3/2007 | Siddaramappa .. | G06F 17/30908 |
| 2008/0270538 A1 | 10/2008 | Garg et al. | |

(Continued)

OTHER PUBLICATIONS

Alur, Nagraj, et al., "LinkIntegrity+: A Web Asset Integrity Solution," Proceeding of the 2nd International Conference on Internet Computing (IC 2001), Jun. 2001, pp. 582-590.

(Continued)

*Primary Examiner* — Etienne P Leroux
(74) *Attorney, Agent, or Firm* — Scully, Scott, Murphy & Presser, P.C.; Daniel R. Simek

(57) ABSTRACT

Propagating information in a computer network, in one aspect, may include detecting an online action performed by a user on a content presented on a computer. The content may be annotated with an identifier. A semantic graph may be searched for a semantic node representing the identifier. The semantic graph may be searched for one or more other semantic nodes representing one or more other identifiers that meet a semantic similarity threshold based on weighted distances between the semantic node and the one or more other semantic nodes. One or more other users represented in a social graph may be determined that have interest in one or more topics represented by the identifier and the one or more other identifiers. The online action on the content may be propagated to the one or more other users.

17 Claims, 10 Drawing Sheets

(56) References Cited

U.S. PATENT DOCUMENTS

| | | | |
|---|---|---|---|
| 2011/0179084 A1* | 7/2011 | Waddington | G06Q 30/02 707/794 |
| 2012/0179972 A1* | 7/2012 | Hacid | G06F 17/30899 715/738 |
| 2012/0203734 A1* | 8/2012 | Spivack | G06F 17/3087 707/602 |
| 2012/0221555 A1 | 8/2012 | Byrne et al. | |
| 2012/0254184 A1* | 10/2012 | Choudhary | G06Q 30/0201 707/738 |
| 2012/0324367 A1 | 12/2012 | Ilyas et al. | |
| 2013/0007124 A1 | 1/2013 | Sweeney et al. | |
| 2014/0019385 A1 | 1/2014 | Dawson et al. | |
| 2014/0019443 A1 | 1/2014 | Golshan | |
| 2014/0156681 A1 | 6/2014 | Lee et al. | |
| 2015/0074121 A1* | 3/2015 | Ozonat | G06F 17/30731 707/748 |

OTHER PUBLICATIONS

Zelenka, A., "Nova Spivack—Minding the Planet", Nov. 23, 2007, 7 pages, http://www.novaspivack.com/web-3-0/defining-the-semantic-graph-what-is-it-really.

"Linked Data—Connect Distributed Data across the Web", printed on Dec. 18, 2014, 1 page, http://linkeddata.org/.

"What is Schema.org", printed on Dec. 18, 2014, 1 page, http://schema.org/.

Zaino, J., "What Have You Liked Today—and What Are You Going to Do About It?", Nov. 7, 2011, 2 pages, http://semanticweb.com/what-have-you-liked-today-and-what-are-you-going-to-do-about-it_b24492#more-24492.

Li, X., "Under the Hood: The natural language interface of Graph Search", Apr. 29, 2013, 8 pages, https://www.facebook.com/notes/facebook-engineering/under-the-hood-the-natural-language-interface-of-graph-search/10151432733048920.

Facebook, www.facebook.com, 1 page, printed on Dec. 18, 2014.

Pinterest, www.pinterest.com, 1 page, printed on Dec. 18, 2014.

Circleme, http://circleme.com, 2 pages, printed on Dec. 18, 2014.

Office Action dated Jun. 14, 2017 received in U.S. Appl. No. 14/742,893, 17 pages.

Zaino, J., "What Have You Liked Today—And What Are You Going to Do About It?", Daraversity, http://www.dataversity.net/what-have-you-liked-today-and-what-are-you-going-to-do-about-it/#more-24492, Nov. 7, 2011, Printed on Sep. 14, 2017, 2 pages.

Thiagarajan, R., et al., "Computing Semantic Similarity Using Ontologies", ISWC 2008, 7th International Semantic Web Conference, Oct. 26-30, 2008, Posting Date Jul. 6, 2008, 17 pages.

* cited by examiner

INFORMATION PROPAGATION VIA WEIGHTED SEMANTIC AND SOCIAL GRAPHS

FIELD

The present application relates generally to computers and computer applications, and more particularly to online communications and information propagation via weighted semantic and social graphs.

BACKGROUND

Information propagation is a popular topic in today's socially connected networks. Presenting minimal and yet most effective and relevant information to users can be easier to achieve if social and semantic networks come together. Today's social network solutions have a powerful social network, but they still do not fully leverage semantic networks to propagate most relevant information to users based on the user's interests. While a number of interest based social networks have appeared and attracted a large number of users, the users would have to switch between social networks to go about various social activities of their interest.

BRIEF SUMMARY

A method and system of propagating information in a computer network may be provided. In one aspect, the method may comprise detecting an online action performed by a user on a content presented on a computer. The content may be annotated with an identifier, e.g., one or more identifiers. The method may also comprise searching a semantic graph stored on a memory device for a semantic node representing the identifier, e.g., each of one or more identifiers. The method may further comprise searching the semantic graph for one or more other semantic nodes representing one or more other identifiers that meet a semantic similarity threshold based on weighted distances between the semantic node and the one or more other semantic nodes. The method may also comprise determining one or more other users represented in a social graph that have interest in one or more topics represented by the identifier and the one or more other identifiers. The social graph may be stored on the memory device and comprise a network of social nodes representing users. The method may also comprise propagating the online action on the content to the one or more other users.

A system of propagating information in a computer network, in one aspect, may comprise one or more semantic graphs stored on one or more memory devices, the one or more semantic graphs comprising respective one or more networks of semantic nodes. A social graph may be stored on one or more of the memory devices, the social graph comprising a network of social nodes representing users. A processor may be operable to detect an online action performed by a user on a content presented on a user interface, the content annotated with an identifier. The processor may be further operable to search the one or more semantic graphs for a semantic node representing the identifier. The processor may be further operable to search the semantic graph for one or more other semantic nodes representing one or more other identifiers that meet a semantic similarity threshold based on weighted distances between the semantic node and the one or more other semantic nodes. The processor may be further operable to determine one or more other users represented in the social graph that have interest in one or more topics represented by the identifier and the one or more other identifiers. The processor may be further operable to propagate the online action on the content to the one or more other users.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
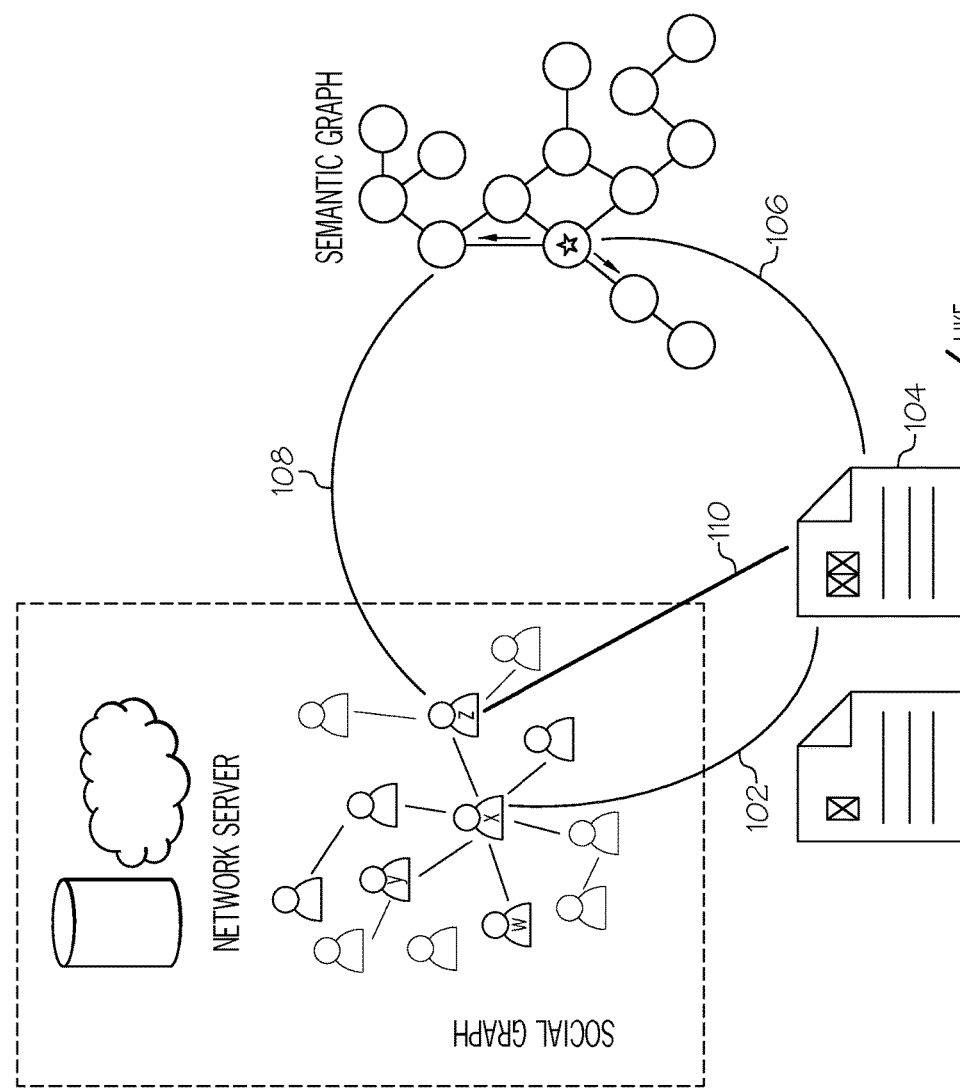
FIG. 1 is a diagram that illustrates how social and semantic graphs may be leveraged to propagate information associated with social actions in one embodiment of the present disclosure.

Techniques are presented that may empower social networks to connect users to their social connections and at the same time, allow the users to connect to each other via their common interests. For example, if a user shares an article on a social network site all his/her friends would see that article on their feed; even though only a small percentage might be interested in the topic. Leveraging the underlying semantics of the article and cross referencing it with user's social network's interests, the social network provider could present this article only to those who are likely to have an interest in it. This way, the content is targeted to a subset of users who are likely to welcome it.

Social graph represents social network and refers to a graph that represents how internet users are connected to each other through a particular relationship type, e.g., friendship, workplace hierarchy, location, and others. Edges of the graph represent user connections.

Semantic graph represents semantic network and refers to a graph in which each node is uniquely represented, e.g., via a uniform resource identifier (URI), and linked to a unique concept. Nodes in this graph are linked via edges that identify the semantic relation between nodes, e.g., sub-type, super-type, membership, and others. This relationship is also defined and exposed in a machine-understandable fashion, e.g., in Resource Description Framework (RDF). Different semantic networks may exist. These graphs could be a result of the web of data that is produced by connecting related data.

Weighted social and semantic graph refers to a social and/or semantic graph whose edges are assigned weight values based on the edge type and what each edge semantically represents. An edge's weight value determines how close or distant its two nodes are.

Social network provider provides solutions that allow internet user connect virtually and share information.

Social action refers to any mechanism that triggers a social outcome. Examples may include subscribing to or liking a page or an article, posting comment on a page or article, or sharing content.

Social and semantic enabled content refers to any internet artifact, e.g., articles, images, widgets, and others, that is augmented with one or more URIs that belong to a semantic graph, and provides social actions to users. In the present disclosure, "content" is social and semantic enabled unless specified otherwise. Web content may be annotated with semantic markup.

Distance limit refers to a number that indicates how far one can traverse from a given node in a weighted graph.

A mechanism in one embodiment of the present disclosure leverages social graph and semantic graphs to propagate information to users who are socially connected and share a common interest. In a social network a user is connected to a number of other users each having their own connections. Through social actions that each user performs, a knowledge-base is built that indicates what each user is interested in.

If this knowledge-base is semantically enabled, e.g., annotated with URIs from a semantic graph, it provides means for connecting users that are not quite interested in the same concept, but are interested in concepts that are quite related. The similarity of concepts is determined by how they are related to each other. This relationship can be assigned a weight that determines the closeness of semantic concepts. For example, the relation "is the same as" is assigned the weight "0"; the relation "is a" is assigned the weight "1".

Aside from the semantic connections, social connections can also be assigned weights that, for example, show spouses, brothers/sisters, and parents/children (e.g., relatives) are closer to each other than those who are just friends. The detection of social connection can also improve over time by observing which connections are more active.

With these assumptions a social network provider is managing a weighted social network, and using one or more weighted semantic networks. If this social network provider was able to propagate information to friends (or friends of friends) of a user x it can now optimize this information propagation to a set of users U who share similar interests I, such that: Users in U are socially connected (directly or indirectly) to user x through social connections whose maximum aggregate weight is a preset value Lsoc; Each URI in I is semantically connected (directly or indirectly) to one of user x's interests through semantic connections whose maximum aggregate weight is a preset value Lsem.

In one embodiment, the techniques of the present disclosure may use semantic graphs to link users' interests, use social graph to propagate relevant information among users who are connected to each other, use social graph and semantic graphs to link users who share similar interests. Creating links between semantic graphs that come from different domains connects users on a much wider scale. Having content residing on different domain allows for cross-domain information propagation. Social provider can use this association to target people and deliver relevant information, such as advertisements.

A system may be presented that provides a mechanism to propagate information to all subscribers of semantically related topics. An algorithm may be provided that evaluates social weights to limit information propagation to only those who are closely related. An algorithm may be provided that evaluates semantic weights to limit information propagation to only those who share similar interests.

FIG. 1 is a diagram that illustrates how social and semantic graphs may be leveraged to propagate information associated with social actions in one embodiment of the present disclosure. FIG. 1 shows an example use case of how a user may trigger a social action, and how that action may propagate information to relevant users in his/her social network. A user visits a content page containing metadata that link to unique URIs, for example, shown at 102. User takes a social action on the content page 104 that allows a social provider to link the user to the unique URIs, for example, shown at 106. An example of an action may include "liking" content on a content page. Social provider traverses from each URI outward based on a distance limit. As it traverses, it looks for friends within the network who are interested in the URIs along the path, for example, as shown at 108. Social provider may then share the action with those friends as shown at 110. The social and semantic graphs may be stored or exist in different servers or on the same server. In another embodiment, the social and semantic graphs may be independent. For example, a semantic graph need not reside on a social networking domain that includes or provides the social graph.

The following example describes, via a simple scenario, how weighted social and semantic networks can be integrated to improve information propagation in social networks. User X belongs to a social network and has Y, Z and W as his immediate connections. User X reads an article on table tennis, which is annotated with the keyword 'table tennis', and comments on it using his social service. User Y is a member of the Top Spin ping pong club, which is annotated with the keyword ping pong club, and has already registered to the club's social page via the same social network provider. User Z follows player TB, a table tennis champion on the same social network provider. Player TB's page is annotated with the keyword TB. User W has not performed any social action in the table tennis domain.

Based on the above information, X, Y, and Z are considered to be interested in three different things. For example, because X comments on an article it may be assumed that he has an interest in what the article is about. In this case the article is annotated with the keyword table tennis. Therefore, X is interested in table tennis. Because Y has registered to a social page, it may be assumed that he is interested in what the page is about. In this case, the page is annotated with the keyword ping pong club. Therefore, Y is interested in ping pong club. Because Z follows a person it may be assumed that he is interested in that person. In this case, Z is interested in player TB. Hence, without a semantic network that semantically connects those interests, these users cannot be linked through their interests even though their interests may be closely related.

Figure 2:
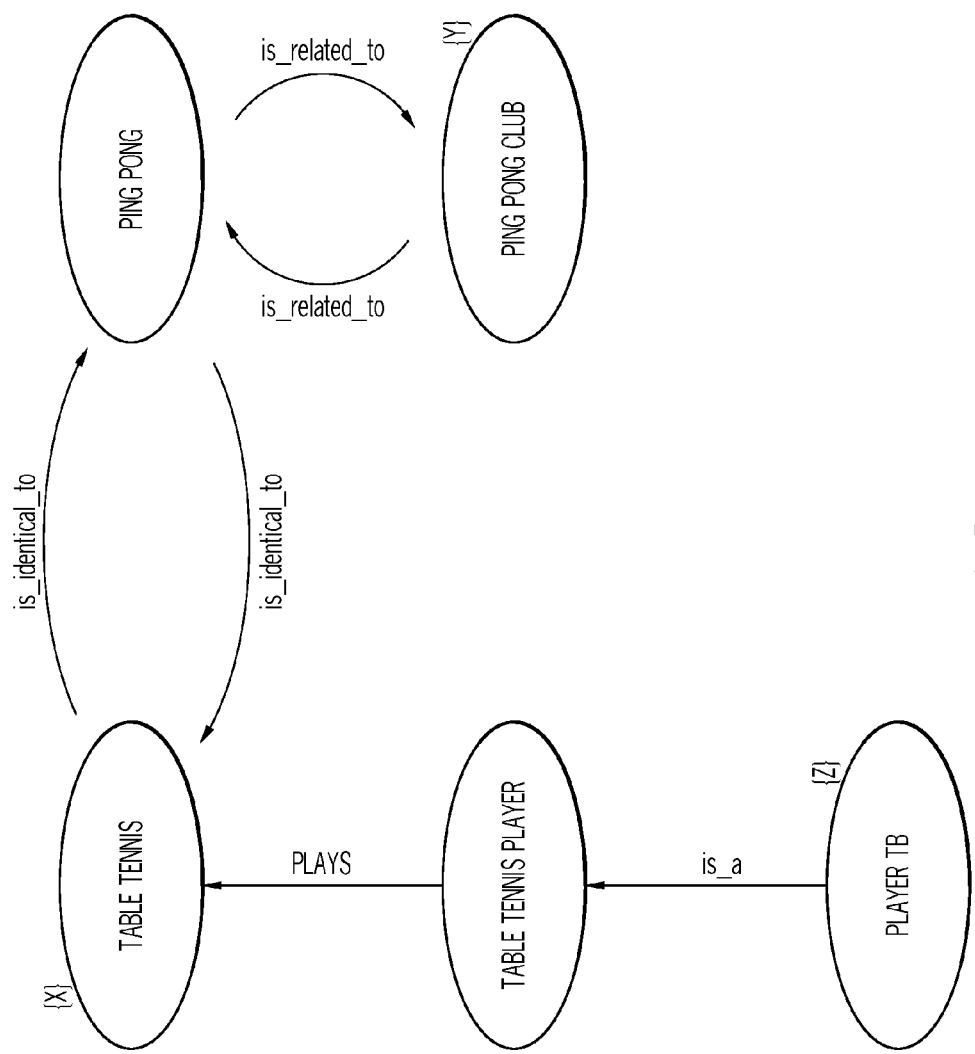
FIG. 2 illustrates an example semantic graph that connects names and concepts in a domain in one embodiment of the present disclosure.

However, assume this social network provider makes use of a semantic network that connects these interests as shown in FIG. 2. FIG. 2 illustrates an example semantic graph that connects names and concepts in a domain, for example, a table tennis domain illustrated in the above example. Using this semantic graph enables the social network provider to analyze and understand the relationships among the keywords. The social network provide may assign weights to each relationship type (is-a, is identical to, or other) and determine how close or distant two terms are. From there, the social network provider may determine how close or distant users' interests are.

For example, assume the following weights are assigned to the above relationship types. In this example, the lower the weight, the closer are the terms: "is_identical_to" to 0, "plays" to 1, "is_a" to 1, "is_related_to" to 2. Based on these weights, it may be determined how close interests of X, Y, and Z are. For example, X and Y: 2, X and Z: 2, Y and Z: 4, W and each of X, Y, and Z: infinity. In this example, the weights of the edges are summed, e.g., between X and Y, the weights of edges "is_identical_to" and "is_related_to" are summed to produce 2. Similarly, between X and Z, the weights of edges "plays" and "is_a" are summed to produce 2. Likewise, between Y and Z, the weights of edges "is_related_to", "is_identical_to", "plays" and "is_a" are summed to produce 4.

In one embodiment, a semantic distance limit may be set or defined, for example, as a threshold for determining content sharing, e.g., whether to present information related to a user's action to another user. For instance, if a semantic distance limit, Lsem, is set to 3, then whenever X takes a social action on a content that is annotated with the keyword (e.g., table tennis), that action appears on Y and Z's social feed, but not on W's feed; Whenever Y takes a social action on his ping pong club's social page, that action appears on X's feed, but not on Z or W's feed; Whenever Z takes a social action on player TB's social page, that action appears on X's feed, but not on Y or W's feed.

Figure 3:
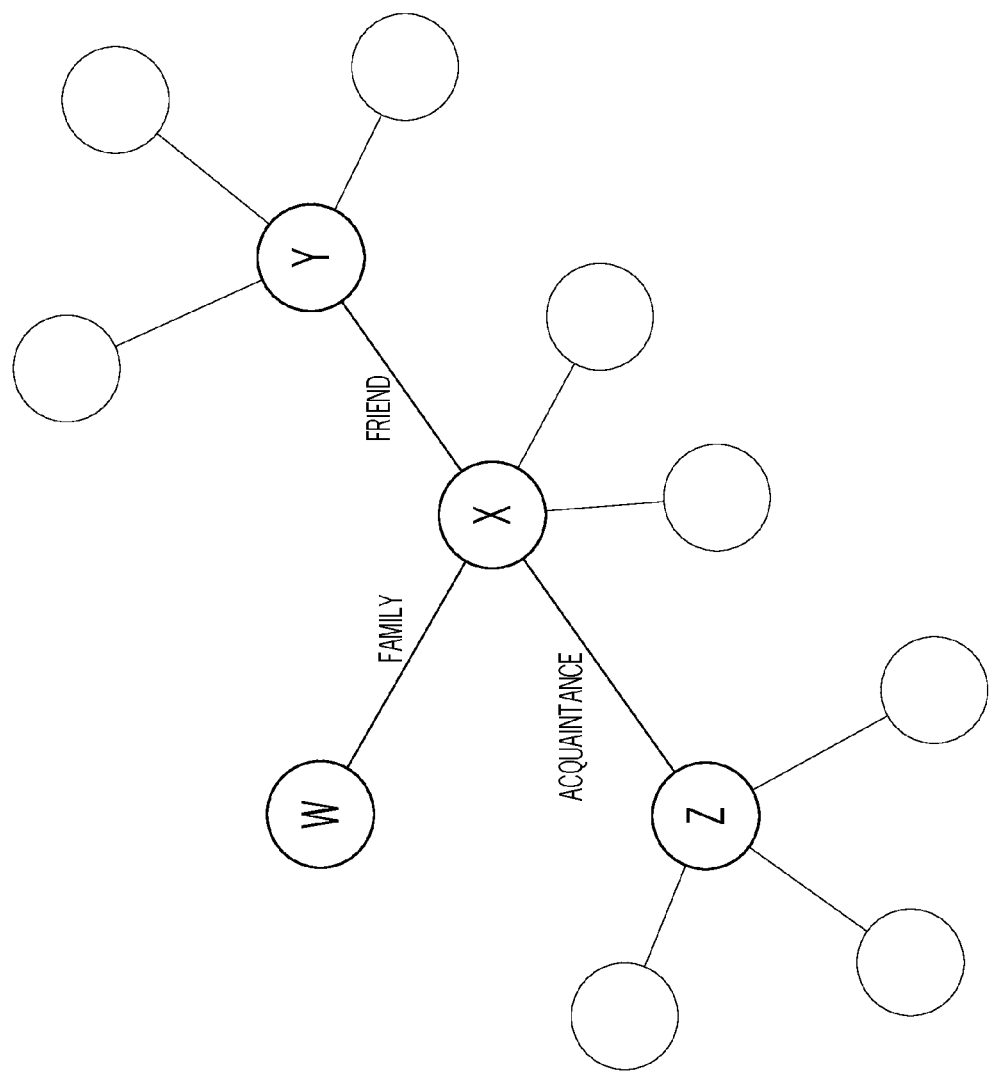
FIG. 3 shows an example social graph of users in one embodiment of the present disclosure.

FIG. 3 shows an example social graph of users in one embodiment of the present disclosure. Consider that the social graph shown in FIG. 3 is of users X, Y, and Z described in the above example. The social network provider may assign social weights to users relationship types: e.g., family: 1, friend: 2, acquaintance: 3. A social distance limit, Lsoc may be also set or defined, for example, as another threshold for determining content sharing, e.g., whether to present information related to a user's action to another user. For instance, the social network provider may set the social distance limit. An example Lsoc value that is set may be 2. With this additional threshold value, the above rules may change as follows: Whenever X takes a social action on a content that is annotated with the keyword table tennis, that action appears on Y's social feed, but not on Z or W's feed (because Z's social distance limit, in this example, 3 exceeds the threshold value, Lsoc set to 2; Whenever Y takes a social action on his ping pong club's social page, that action appears on X's feed, but not on Z or W's feed; Whenever Z takes a social action on player TB's social page, that action does not appear on X or Y or W's feed.

In another aspect, the social network provider may define further rules in addition to the above rules based on Lsem and Lsoc values, for example, to optimize content sharing. For example, there may be a rule that if social connection weight is not more than 1, then ignore semantic similarity all together (e.g., so that content is shared within family even if it is not aligned with people's interests). This sample rule again changes the above scenario. For instance, all social actions by X (irrespective of the underlying semantics) may appear on W's feed, and all social actions by W may appear on X's feed.

Figure 4:
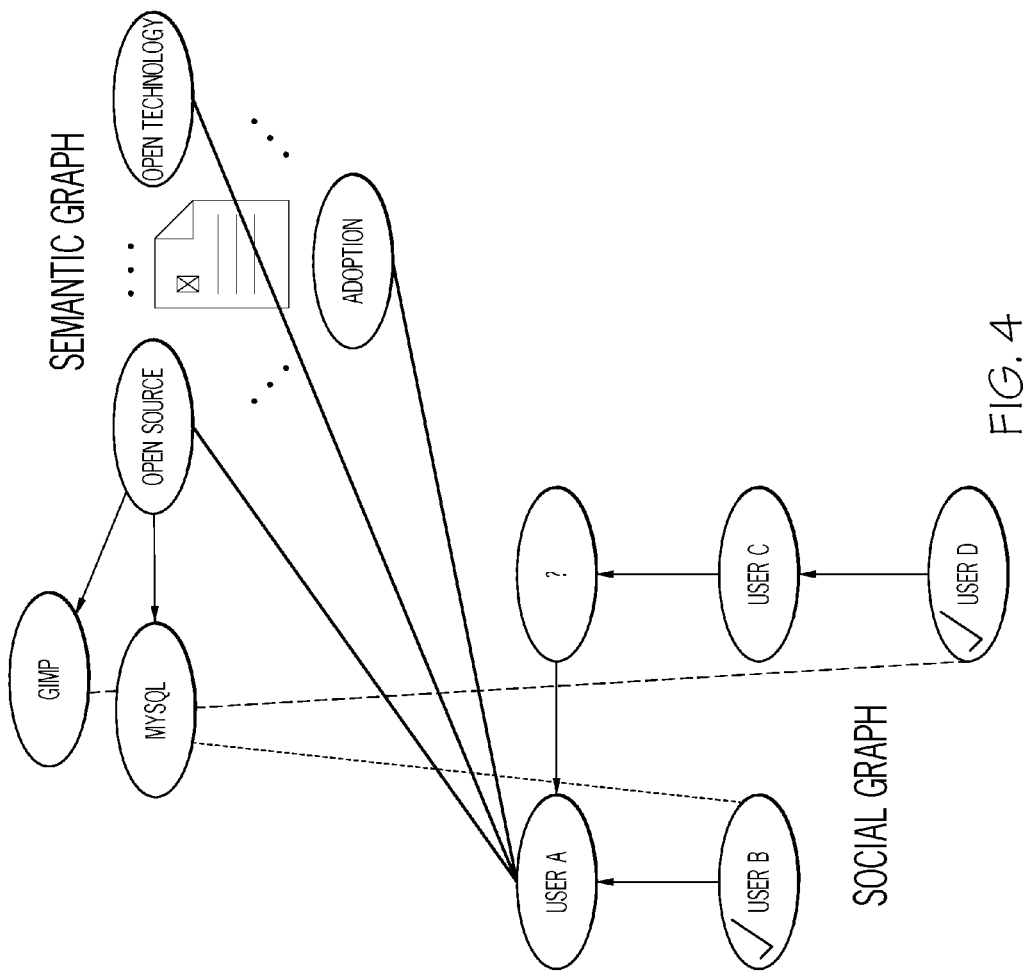
FIG. 4 is a diagram showing an example relationship between a social graph and a semantic graph in one embodiment of the present disclosure.

FIG. 4 is a diagram showing an example relationship between Social Graph and Semantic Graph in one embodiment of the present disclosure. The example shown in FIG. 4 illustrates content sharing based on social and semantic network in an enterprise context. The example shows how a semantic and social graph can lead to collaboration across different departments. The following describes the players and how information propagation affects them. User A, the Vice President of Cloud Labs, wants to steer his organization toward adopting the use of open technology. He decides to publish an article outlining this new direction. He decides to annotate the article with the following URIs: open technology, open source, and adoption. He also decides to loosen the restriction on this article so that anyone within the company can read it. User B is the open standards department manager and she works directly under User A. User B may be notified of the article that User A published because User B's work involves open source (e.g., MySQL) and User B is directly connected to User A. User C is the department manager in charge of performance in a completely different organization. User C may not be notified of User As article because it has no relevance to User C. However, User C's manager is connected to User A because they were colleagues in the past. User D, a developer working under User C, works on prototyping and client engagement. User D is always looking to update herself with the latest technology and often chooses to use open technology in her work. Because of User D's interest in open technology and her limited connection to User A (via User C and User C's manager in social graph), User D may also be notified of the article. FIG. 4 illustrates these social, semantic, and social-semantic connections.

Figure 5:
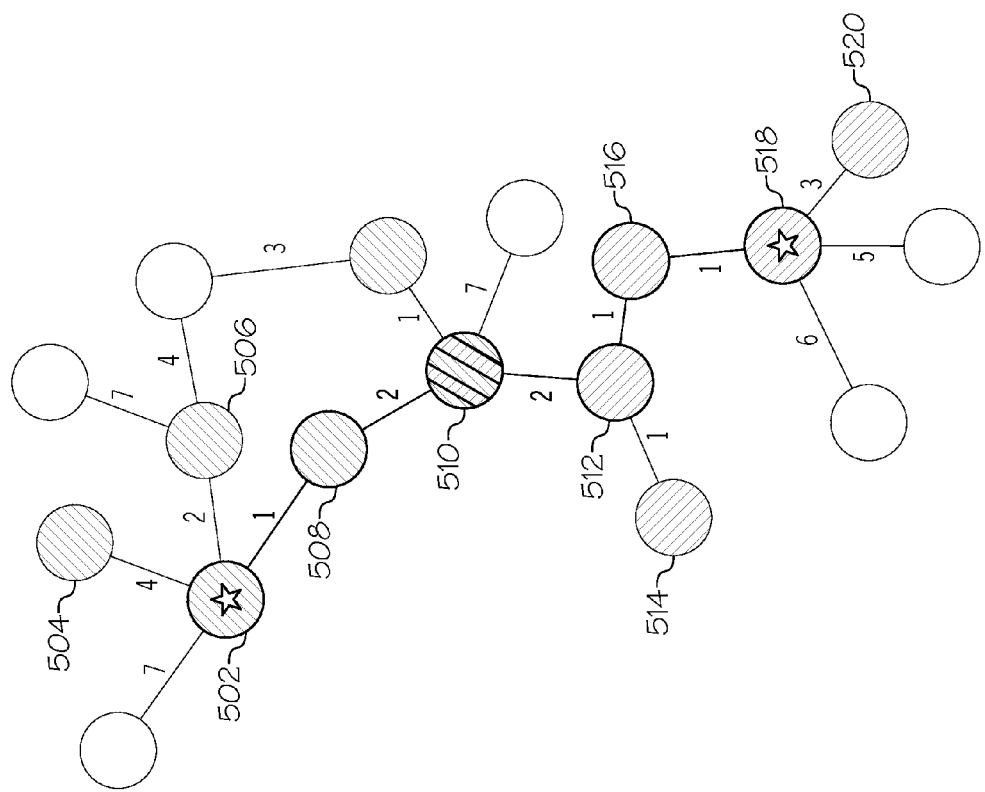
FIG. 5 illustrates an example of the role of semantic similarity in a semantic graph in determining common interests of social users in one embodiment of the present disclosure.

In one embodiment of the present disclosure, an information propagation algorithm works by finding common interests among social users based on user interests and how those interests are related in the semantic graph. For example, FIG. 5 shows a weighted semantic graph where relations are given weights to determine how close nodes or the concepts their URIs represent are. FIG. 5 illustrates an example of the role of semantic similarity in a semantic graph in determining common interests of social users. Assume that the starred nodes 502, 518 are interests of users A and B, respectively; and the semantic distance limit is set to 4. Then, the nodes shown at 502-510 are considered semantically similar to the starred red node (i.e., interest of user A) shown at 502 because their semantic distance from that node is within the distance limit 4. Similarly, the nodes shown at 510-520 are considered semantically similar to the starred node (i.e., interest of user B) shown at 518. As a result, the striped node shown at 510 represents a URI that is semantically similar to interest of both A and B. Assuming A, B and C are within social distance limit of each other, for instance, if user C takes a social action on a content that is annotated with the URI of node 510 (the striped node) users A and B may be notified of that action.

An information propagation system and/or method in one embodiment utilize a semantic graph and a social graph. More than one semantic graph and more than one social graph may be utilized. Social network software, service or the like that provides for online social networking capability may define may define weight values for relationship types in semantic graphs. Social network software, service or the like may define weight values for relationship types in the social graph. Social network software, service or the like may define a distance limit Lsem for one or more semantic graphs and a distance limit Lsoc for a social graph. Contents may be annotated with URIs from semantic graphs. For example, the authors of the contents or other users may annotate the content. Social network software or the like may track user interests by associating URIs to users.

Figure 6:
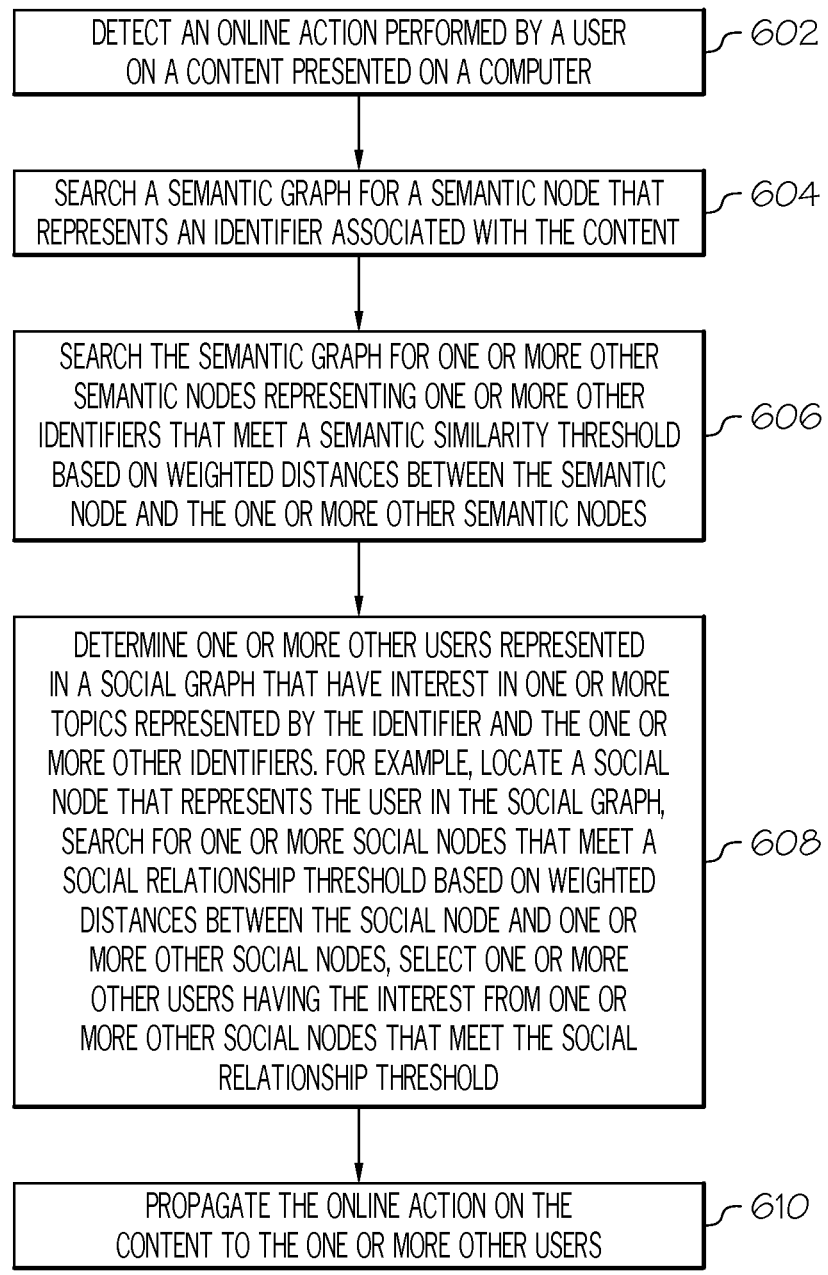
FIG. 6 is a flow diagram illustrating a method in one embodiment of propagating information via weighted semantic and social graphs.

FIG. 6 is a flow diagram illustrating a method in one embodiment of propagating information via weighted semantic and social graphs. The processing of the method may be performed by a social networking or media tool or software, for example, executing on one or more computer processors. As an example, such social networking or media tool may include computer components that implement social network or media web sites or the like and allow users to register and to share information via the web sites or the like with others, for example, connect to other users and communicate data such as text and/or media.

At 602, an online action performed by a user on a content presented on a computer may be detected. The content may include one or more of social networking and/or social media content, for example, text, video, audio, and other content. The content may be annotated with an identifier, for example, a URI. In one embodiment, a user may annotate the content, for example, with semantic topics belonging to an existing semantic network. Examples of an online action may include, but are not limited to, subscribing to the content, commenting on the content, sharing the content, liking the content, and/or others.

At 604, a semantic graph is searched or traversed for a semantic node that represents the identifier associated with the content. The semantic graph may be stored on a memory device and includes a network of nodes (referred to as semantic nodes for the sake of explanation only). For example, each semantic node may represent an identifier, for example, a URI. An example of a semantic graph is shown in FIG. 2. A semantic graph may be stored as a data structure, for example, a tree structure, a linked list structure, and/or another data structure.

At 606, the semantic graph is searched or traversed for one or more other semantic nodes representing one or more other identifiers that meet a semantic similarity threshold (also referred to above as Lsem) based on weighted distances between the semantic node and the one or more other semantic nodes. For instance, the edges connecting the semantic nodes of the semantic graph are weighted and the weighted distances are computed based on weights of the respective edges that connect the semantic node and the one or more other semantic nodes. The semantic similarity threshold may be configurable, for example, by a tool, software or service that is providing the capability to propagate information.

In one embodiment, more than one semantic graph may be employed. For instance, two or more semantic graphs may be searched to identify semantic nodes (e.g., URIs) that are considered to be similar to the annotated content (e.g., URI of the content on which the online action is performed and detected).

At 608, one or more other users represented in a social graph that have interest in one or more topics represented by the identifier and the one or more other identifiers are determined. The social graph may be stored on the memory device and includes a network of nodes (referred to as social nodes for the sake of explanation only) representing users. For example, each social node in a social graph may represent a user. An example of a social graph is shown in FIG. 3. A social graph may be stored as a data structure, for example, a tree structure, a linked list structure, and/or another data structure.

In one embodiment, one or more other users represented in the social graph may be determined, for example, by locating a social node that represents the user in the social graph. The social graph may be searched for one or more social nodes that meet a social relationship threshold (also referred to above as Lsoc) based on weighted distances between the social node and one or more other social nodes. One or more other users may be selected from one or more other social nodes that represent users that have interest in one or more topics represented by the identifier and one or more other identifiers, for example, determined at 606.

In one embodiment, the edges connecting the social nodes of the social graph may be weighted and the weighted distances between the social node and the one or more other social nodes are computed based on weights of the respective edges that connect the social node and the one or more other social nodes.

In one embodiment, the social relationship threshold may be configurable, for example, by the tool, software or service providing the capability of propagating information, or by one or more users, for example, by the user performing the online action, or one or more other users having social relationship with the user.

Interests of users represented in the social graph may be identified, for example, by performing analysis (e.g., text analysis, natural language processing analysis, metadata analysis) on the respective user profiles and content posted on the user's social networking and/or social media sites or the like. Other techniques may be employed to identify interest of users.

At 610, the online action on the content is propagated to the one or more other users, for example, via a social network or media web site or the like. For instance, the online action on the content or such information may be presented on social network page, a blog page or the like, of those one or more other users.

Figure 7:
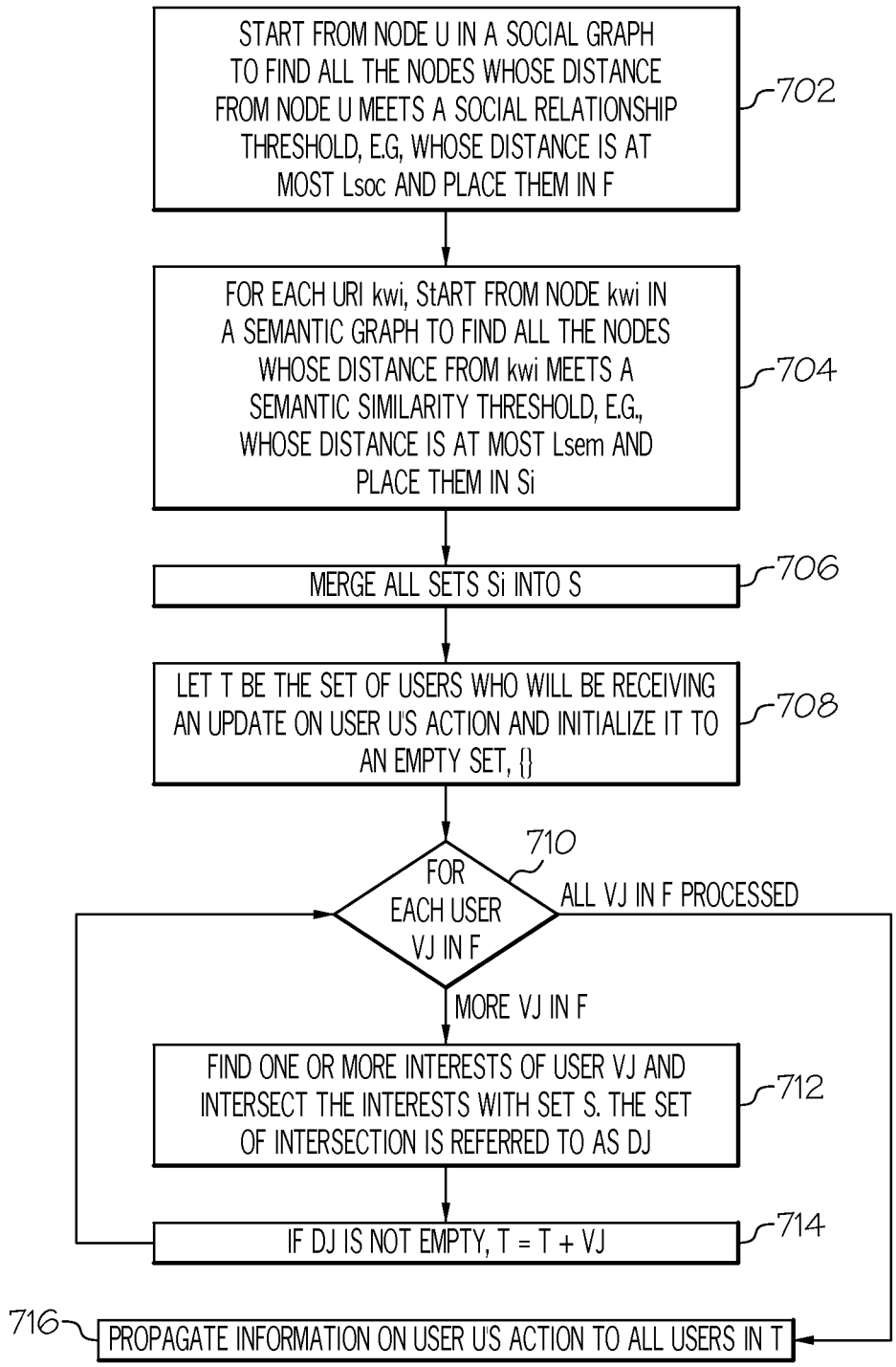
FIG. 7 is a flow diagram illustrating an example algorithm in one embodiment of the present disclosure for determining one or more user to whom to propagate information, based on weighted social and semantic graphs.

FIG. 7 is a flow diagram illustrating an example algorithm in one embodiment of the present disclosure for determining one or more user to whom to propagate information, based on weighted social and semantic graphs. A system and/or method of the present disclosure in one embodiment may detect an online social action (e.g., subscribing to, commenting on, liking content, or sharing content, or another) by a user (e.g., user u) on content. The content may be annotated with identifiers such as URIs (e.g., URIs kw1, kw2, . . . , kwn). In one embodiment, a user may annotate the content, for example, with semantic topics belonging to an existing semantic network.

At 702, using an algorithm such as the Breadth-First-Search (BFS), start from node u (node that represents user u) in a social graph to find all the nodes whose distance from node u meets a social relationship threshold, for example, whose distance is at most Lsoc and place them in F. In this example algorithm, the distance of two nodes in the social graph is the minimum total weight of all graph paths between them. Other distance computation mechanisms may be used. F contains the set of potential connections of user u along with their socially weighted distance from user u who will receive an update on user u's social action. In this example, u does not belong to F.

At 704, for each URI kwi, for example using an algorithm such as the BFS algorithm, start from node kwi (i=1 to n) in a semantic graph to find all the nodes whose distance from kwi meets a semantic similarity threshold, for example, whose distance is at most Lsem and place them in Si (i=1 to n). In this example, the distance of two nodes in the semantic graph is the minimum total weight of all graph paths between them. Other distance computation mechanisms may be used. Si contains the set of URIs that are semantically similar to kwi along with their semantically weighted distance from kwi that will be analyzed to find best propagation targets for user u's action. URI kwi belongs to set Si with semantic distance 0.

At 706, merge all sets Si into S. In one embodiment of a methodology of the present disclosure, if a URI c is repeated in multiple sets, only the one with the lowest semantic distance appears in S.

At 708, let T be the set of users who will be receiving an update on user u's action and initialize it to an empty set, {}.

At 710, for each user vj in F, perform 712 and 714 processing. At 712, find one or more interests of user vj from a social network provider (e.g., tool, software the like, with which user vj is associated with (e.g., registered with)) and intersect the interests with set S. Call the intersection (which includes associated semantic distance of each member) Dj. Dj contains those interests of user vj that are semantically similar to URIs of the content on which user u performed a social action.

At 714, if Dj is not empty, T=T+vj. Dj not being empty implies that user vj has similar interests to the content on which user u took action. At 716, propagate information on user u's action to all users in T.

Figure 8:
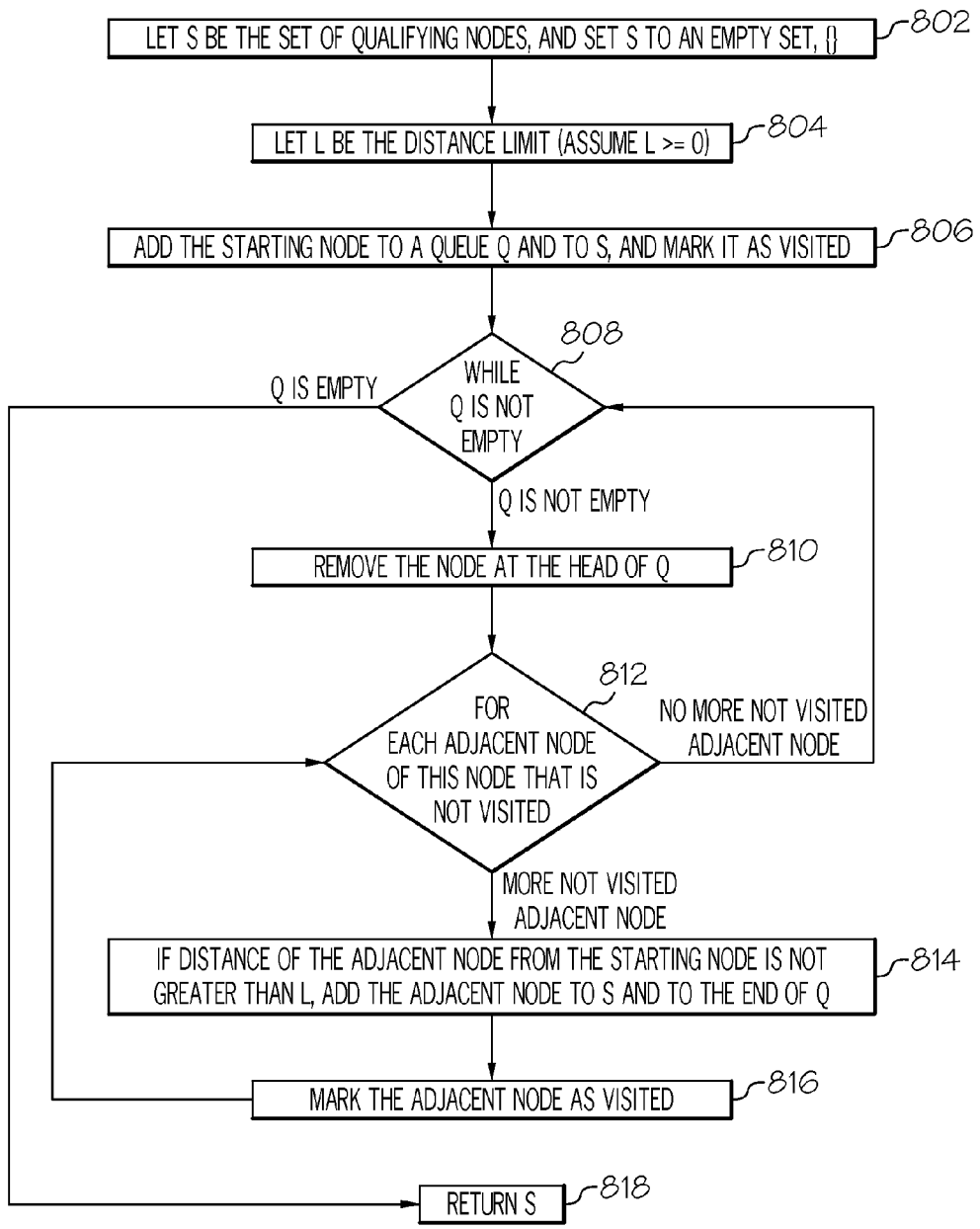
FIG. 8 is a flow diagram illustrating a BFS algorithm, for example, which may be used in an information propagation algorithm of the present disclosure.

FIG. 8 is a flow diagram illustrating the BFS algorithm, for example, which may be used in an information propagation algorithm of the present disclosure, for example, at 702 and 704 of FIG. 7. At 802, let S be the set of qualifying nodes, and set S to an empty set, {}. At 804, let L be the distance limit (assume L>=0). At 806, add the starting node to a queue Q and to S, and mark it as visited.

At 808, while Q is not empty, perform 810 and 812 processing. At 810, remove the node at the head of Q. At 812, for each adjacent node of this node that is not visited, perform 814 and 816 processing. At 814, if distance of the adjacent node from the starting node is not greater than L, add the adjacent node to S and to the end of Q. At 816, mark the adjacent node as visited. At 818, return S.

Figure 9:
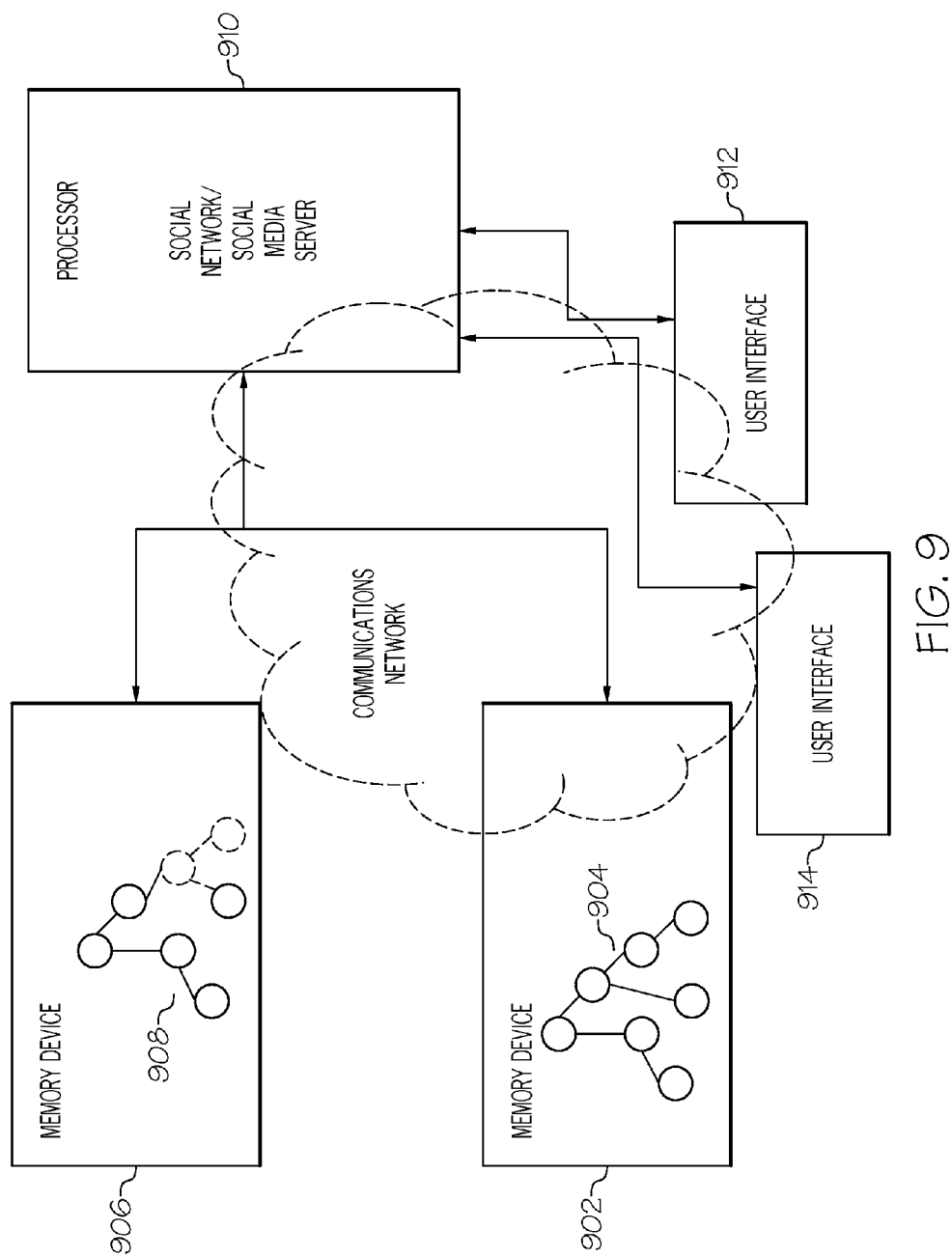
FIG. 9 is a diagram illustrating an example system for propagating information in a computer network in one embodiment of the present disclosure.

FIG. 9 is a diagram illustrating an example system for propagating information in a computer network in one embodiment of the present disclosure. One or more semantic graphs may be stored on one or more memory devices (e.g., 902). A semantic graph (e.g., 904) may include a network of semantic nodes. A social graph (e.g., 908) may be stored on one or more of the memory devices (e.g., 906). A social graph (e.g., 908) may include a network of social nodes representing users, for example, users registered with a social network server operable to run on a processor (e.g., 910). A processor (e.g., 910, e.g., implementing a social network and/or social media server) may be operable to detect an online action performed by a user on a content presented on a user interface (e.g., 912). For instance, a user on a user computer may log into the user's social network or media page and perform an action on a content displayed on the page. The content may be annotated with an identifier, e.g., a URI. In one embodiment, the annotated URI may exist in an existing semantic graph.

The processor (e.g., 910) may search the one or more semantic graphs (e.g., 904) for a semantic node representing the identifier. The processor (e.g., 910) may search the semantic graph (e.g., 904) for one or more other semantic nodes representing one or more other identifiers that meet a semantic similarity threshold based on weighted distances between the semantic node and the one or more other semantic nodes. The processor (e.g., 910) may determine one or more other users represented in the social graph (e.g., 908) that have interest in one or more topics represented by the identifier and the one or more other identifiers. The processor may propagate the online action on the content to the one or more other users, for example, via a user interface employed by those one or more other users (e.g., 914). The user interfaces (e.g., 912, 914) may be implemented or run on one or more processor (e.g., used by users), e.g., including but not limited to, mobile devices (e.g., mobile phone, tablets, phablets, laptops, and others), personal computer, workstation, and/or others.

The processor (e.g., 910) may determine one or more other users represented in the social graph that have interest in one or more topics represented by the identifier and the one or more other identifiers by locating a social node that represents the user in the social graph (e.g., 908), searching the social graph for one or more social nodes that meet a social relationship threshold based on weighted distances between the social node and one or more other social nodes, and selecting the one or more other users from the one or more other social nodes that have interest in one or more topics represented by the identifier and the one or more other identifiers. The weighted distances between the social node and the one or more other social nodes may be computed based on weights of the edges that connect the social node and the one or more other social nodes.

The processor (e.g., 910) may define weights associated with edges connecting the social nodes of the social graph (e.g., 908), weights associated with edges connecting the semantic nodes of the one or more semantic graphs (e.g., 904), the semantic similarity threshold, or the social relationship threshold, or combinations thereof.

The components (e.g., 902, 906, 910, 912, 914) may be coupled or connected via a communication network, e.g., local or remote.

As discussed above in various aspects, techniques are presented for delivering content based on content topic criteria and social contact criteria. Generally, a content that may be tagged with uniform resource identifiers (URIs) may be received for sharing from a user, for example, by an online service or tool. A subset of other users meeting a subject interest nearness criterion and a social nearness criterion may be determined to facilitate propagating the content and/or information associated with one or more actions performed on the content. Delivering of the content may be controlled based on weighting factors associated with one or more of social relationship, subject or topic, community, sentiment, historical communication, and/or others. Examples of the online service or tool may include, but are not limited to an online social networking community, a mail system, a short message service (SMS), an instant message (IM), and/or others.

Techniques of the present disclosure may allow socially connected users to communicate based on semantic connections of interests of those users. In one embodiment, the social graph and one or more semantic graphs may be independent, for example, a semantic graph need not reside in the same domain as a social graph, and vice versa. In one aspect, the semantics associated with contents may be used to link people who share similar interests. Content may be annotated, for example, manually or automatically, with semantic topics belonging to one or more existing semantic network. Techniques of the present disclosure may connect users that are already socially connected through their social actions and interests, for example, by leveraging both social and semantic graphs to determine the way to deliver relevant information to users. In one embodiment, more than one social network graph and/or semantic graphs may be utilized.

In one aspect, techniques of the present disclosure may push a piece of content to relevant users. For example, responsive to a social user posting an article, a technique presented herein may help in finding who in his/her social circle have similar interests and should see or receive the article on their social feed. Posts may be delivered or propagated while they are logged in. In one aspect, content authored or touched by a social user may be propagated to only users who are in this user's social neighborhood and whose interests align with this content. In one aspect, each semantic link (edges between nodes of a semantic graph) may be assigned a weight. In one aspect, each semantic link that is unique gets a unique weight assignment. In one aspect, a technique of the present disclosure relies on the semantic network to provide relationships among contents. In one aspect, given social network and semantic network may be used for delivering content to social contacts of a user who are interested in that content. In one aspect, social actions of users may determine their interest. In one aspect, no user involvement may be required to find targets for a posted content. In one aspect, a technique of the present disclosure links social and semantic networks to deliver content that users may find interesting.

Figure 10:
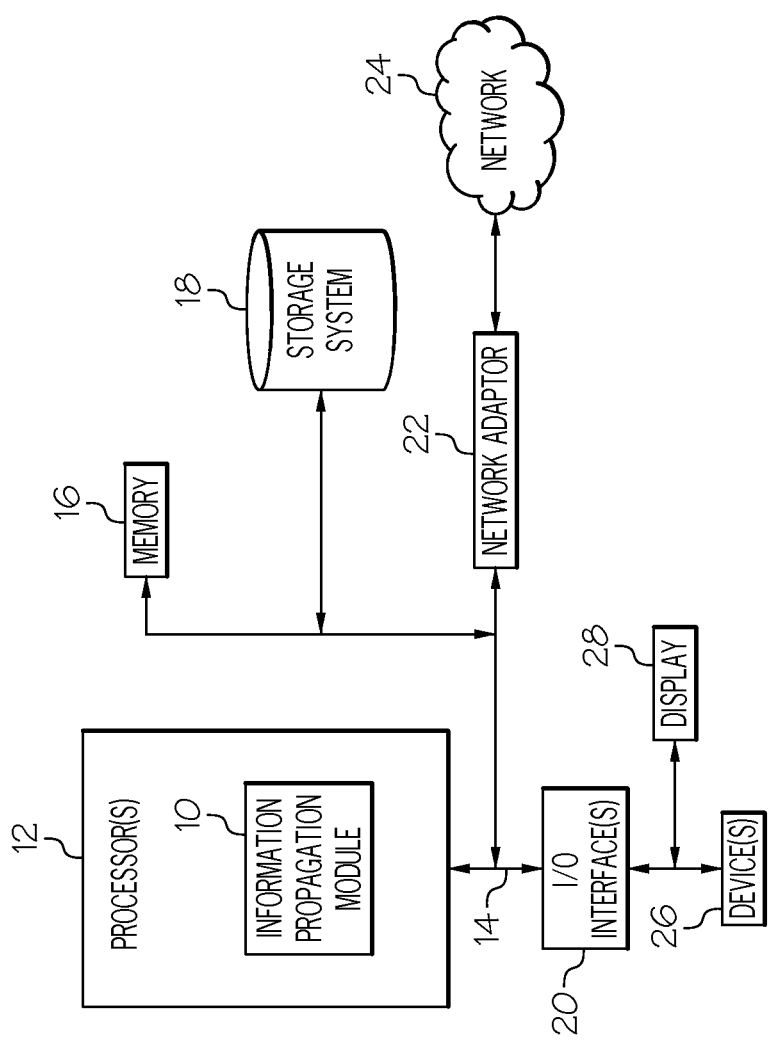
FIG. 10 illustrates a schematic of an example computer or processing system that may implement an information propagation system in one embodiment of the present disclosure.

FIG. 10 illustrates a schematic of an example computer or processing system that may implement an information propagation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of propagating information in a computer network, comprising:
   detecting an online action performed by a user on a content presented on a computer, the content annotated with an identifier comprising a uniform resource identifier (URI);
   searching a semantic graph stored on a memory device for a semantic node representing the identifier;
   searching the semantic graph for one or more other semantic nodes representing one or more other identifiers comprising one or more uniform resource identifiers (URIs) that meet a semantic similarity threshold based on weighted distances between the semantic node and the one or more other semantic nodes;
   placing the one or more other semantic nodes identified by said one or more URIs, and the semantic node identified by the URI in set S;
   searching, in a social graph stored on the memory device and comprising a network of social nodes representing users, starting with a social node u representing the user, for social nodes whose distance from the social node u meet a social relationship threshold;
   placing the social nodes in a set F;
   initializing set T as an empty set;
   for each social node j in the set F:
      determining one or more interests of the social node j that intersect with the set S, and placing the one or more interests of the social node j that intersect with the set S in set D;
      responsive to determining that set D is not empty, adding the social node j to the set T; and
   propagating the online action on the content to one or more social nodes in the set T, the propagating comprising posting the online action as a social feed on social network website pages associated with the one or more social nodes in the set T,
   the method executed automatically by a social network server.

2. The method of claim 1, wherein the social relationship threshold is configurable.

3. The method of claim 1, wherein edges connecting the social nodes of the social graph are weighted and the weighted distances between the social node u and the social nodes are computed based on weights of the edges that connect the social node u and the social nodes.

4. The method of claim 1, wherein the semantic similarity threshold is configurable.

5. The method of claim 1, wherein edges connecting the semantic nodes of the semantic graph are weighted and the weighted distances are computed based on weights of the edges that connect the semantic node and the one or more other semantic nodes.

6. The method of claim 1, wherein the identifier comprises a uniform resource identifier.

7. The method of claim 1, wherein the content comprises social media content.

8. A computer readable storage medium storing a program of instructions executable by a machine to perform a method of propagating information in a computer network, comprising:
   detecting an online action performed by a user on a content presented on a computer, the content annotated with an identifier comprising a uniform resource identifier (URI);
   searching a semantic graph stored on a memory device for a semantic node representing the identifier;
   searching the semantic graph for one or more other semantic nodes representing one or more other identifiers comprising one or more uniform resource identifiers (URIs) that meet a semantic similarity threshold based on weighted distances between the semantic node and the one or more other semantic nodes;
   placing the one or more other semantic nodes identified by said one or more URIs, and the semantic node identified by the URI in set S;
   searching, in a social graph stored on the memory device and comprising a network of social nodes representing users, starting with a social node u representing the user, for social nodes whose distance from the social node u meet a social relationship threshold;
   placing the social nodes in a set F;
   initializing set T as an empty set;
   for each social node j in the set F:
      determining one or more interests of the social node j that intersect with the set S, and placing the one or more interests of the social node j that intersect with the set S in set D;
      responsive to determining that set D is not empty, adding the social node j to the set T; and
   propagating the online action on the content to one or more social nodes in the set T, the propagating comprising posting the online action as a social feed on social network website pages associated with the one or more social nodes in the set T,
   the method executed automatically by a social network server.

9. The computer readable storage medium of claim 8, wherein the social relationship threshold is configurable.

10. The computer readable storage medium of claim 8, wherein edges connecting the social nodes of the social graph are weighted and the weighted distances between the social node u and the social nodes are computed based on weights of the edges that connect the social node u and the social nodes.

11. The computer readable storage medium of claim 8, wherein the semantic similarity threshold is configurable.

12. The computer readable storage medium of claim 8, wherein edges connecting the semantic nodes of the semantic graph are weighted and the weighted distances are computed based on weights of the edges that connect the semantic node and the one or more other semantic nodes.

13. The computer readable storage medium of claim 8, wherein the identifier comprises a uniform resource identifier.

14. The computer readable storage medium of claim 8, wherein the content comprises social media content.

15. A system of propagating information in a computer network, comprising:
   one or more semantic graphs stored on one or more memory devices, the one or more semantic graphs comprising respective one or more networks of semantic nodes;

a social graph stored on one or more of the memory devices, the social graph comprising a network of social nodes representing users;

a processor operable to detect an online action performed by a user on a content presented on a user interface, the content annotated with an identifier comprising a uniform resource identifier (URI), the processor further operable to search the one or more semantic graphs for a semantic node representing the identifier, the processor further operable to search the semantic graph for one or more other semantic nodes representing one or more other identifiers comprising one or more uniform resource identifiers (URIs) that meet a semantic similarity threshold based on weighted distances between the semantic node and the one or more other semantic nodes, the processor further operable to:

place the one or more other semantic nodes identified by said one or more URIs, and the semantic node identified by the URI in set S;

search, in a social graph stored on the memory device and comprising a network of social nodes representing users, starting with a social node u representing the user, for social nodes whose distance from the social node u meet a social relationship threshold;

place the social nodes in a set F;

initialize set T as an empty set;

for each social node j in the set F:
  determine one or more interests of the social node j that intersect with the set S, and place the one or more interests of the social node j that intersect with the set S in set D;
  responsive to determining that set D is not empty, add the social node j to the set T; and propagate the online action on the content to one or more social nodes in the set T, the propagating comprising posting the online action as a social feed on social network website pages associated with the one or more social nodes in the set T, the processor implementing a social network server.

16. The system of claim 15, wherein the processor is further operable to define weights associated with the edges connecting the social nodes of the social graph, weights associated with edges connecting the semantic nodes of the one or more semantic graphs, the semantic similarity threshold, or the social relationship threshold, or combinations thereof.

17. The system of claim 15, wherein the weighted distances between the social node u and the social nodes are computed based on weights of the edges that connect the social node u and the social nodes.

* * * * *